(12) United States Patent
Wright et al.

(10) Patent No.: US 9,458,329 B1
(45) Date of Patent: Oct. 4, 2016

(54) CORROSION PROTECTION BY COATINGS THAT INCLUDE ORGANIC ADDITIVES

(71) Applicant: THE UNITED STATES OF AMERICA AS REPRESENTED BY THE SECRETARY OF THE NAVY, Washington, DC (US)

(72) Inventors: Michael E. Wright, Ridgecrest, CA (US); Andrew P. Chafin, Ridgecrest, CA (US); Joseph W. Tsang, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 363 days.

(21) Appl. No.: 14/172,737

(22) Filed: Feb. 4, 2014

Related U.S. Application Data (60) Provisional application No. 61/762,446, filed on Feb. 8, 2013.

(51) Int. Cl.
*B05D 3/02* (2006.01)
*C09D 5/08* (2006.01)

(52) U.S. Cl.
CPC ....................... *C09D 5/08* (2013.01)

(58) Field of Classification Search
CPC ........ C09D 5/08; C09D 5/028; C09D 5/443; C09D 7/001; C09D 123/0884; C09D 5/4465
USPC ............................................. 428/339
See application file for complete search history.

(56) References Cited

U.S. PATENT DOCUMENTS

| | | | |
|---|---|---|---|
| 3,876,371 A | 4/1975 | Costain et al. | |
| 5,221,371 A | 6/1993 | Dreizin et al. | |
| 5,951,747 A | 9/1999 | Lewis et al. | |
| 7,935,181 B2 | 5/2011 | Hayes et al. | |
| 8,025,981 B2 | 9/2011 | Boocock | |
| 8,114,206 B2 | 2/2012 | Hayes et al. | |
| 2001/0009939 A1* | 7/2001 | Laver | C09D 5/036 524/91 |
| 2003/0096904 A1* | 5/2003 | Hakuta | B32B 17/10302 524/588 |

OTHER PUBLICATIONS

STIC Search Report dated Mar. 21, 2016.*
Novel, 1step, chromate-free coatings containing anticorrosion pigments for metals, Seth, et al. Progress in Organic Coatings 58(2007) 136-145.
Novel aspects of a convenient synthesis and of electroproperties of derviatives based on diphenylamine, Idzik, et al. Helvetica Chimica Acta vol. 91 (2008).

* cited by examiner

*Primary Examiner* — Eisa Elhilo
(74) *Attorney, Agent, or Firm* — Charlene A. Haley (57) ABSTRACT

A composition and method of preparing and adding unique organic additives to a metal-free coating system followed by application then provides long term corrosion protection to a reactive metal surface.

28 Claims, 5 Drawing Sheets

CORROSION PROTECTION BY COATINGS THAT INCLUDE ORGANIC ADDITIVES

CROSS-REFERENCE TO RELATED APPLICATIONS

This is a non-provisional patent application, claiming the benefit of, parent application Ser. No. 61/762,446 filed on Feb. 8, 2013, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relates to the compositions for inhibiting corrosion of metals through use of a protective coating. In particular, metals including those used in vehicles and aircraft that include aluminum and ferrous metals. More specifically, embodiments of the invention describes metal-free coatings (i.e. chromate-free) that afford corrosion-inhibition and protection for several types of metal surfaces that can be pre-treated in using a wide array of non-chromate and/or metal free methods.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Damage due to metal corrosion costs the world billions of dollars annually in repair and maintenance. In addition, it has a tremendous cost in terms of energy. The metal industry spends billions of BTUs each year to take metal oxides and reduce them to pure metals or alloys that can then serve as structural materials in cars, planes, and buildings. Thus, preventing metal corrosion conserve both natural resources in terms of the metal as well as energy. Thus, it also represents a tremendous step is saving energy and hence reducing green house emission during metal production.

Generally structural metal alloys are protected by a series of coatings. Often the first treatment is one that involves only the surface. Examples of this would include alodine (chrome VI) treatment of aluminum alloys and more recently the use chrome III has appeared as a more environmentally acceptable method. Although these pretreatments provide some benefit for corrosion protection, it is quite limited. Their primary role is to promote adhesion and bonding of the next coating material to the metal surface. It is well known to those experienced in the art of corrosion protection that pretreatments do not provide sufficient corrosion protection. There exist pretreatments that are metal free and provide excellent adhesion of primer to the metal. One such example is a commercially available material, PreKote, and it can be used as an embodiment of the invention.

The second coating layer is typically a primer, which can be applied by one of many techniques that can include spraying, electrochemical dipping, rolling, or brushing. The primer provides corrosion protection by two general mechanisms accepted by those who are skillful in the art of corrosion protection. First, the coating provides a physical barrier to oxygen and other elements (e.g. water) that greatly facilitate the oxidation process. This type of protection is referred to as a "barrier protection mechanism." Secondly the primer coating may include an element(s) that chemically reacts or interacts with the metal surface in such a way that the metal is "protected" from oxidation. A widely used and very effective additive is chromate, i.e. chrome VI. However, chromate is very toxic and has been all but ban from use. Chromate primers pose significant health risk during the application and when the primer is removed during refinishing. Other metals like nickel, zinc, and cobalt have been used in conjunction cyanamide pigments (U.S. Pat. No. 5,314,532) and others have reported the use hydrogen phosphate (U.S. Pat. No. 5,126,074).

More recently researchers have created "superprimers" that utilize a combination of silanes and pigments that contain some form of zinc. Although the chromate has been replaced, the primer still utilizes a transition metal pigment for corrosion protection. Furthermore, the epoxy primers utilizing this silane-Zn system only made 2000 h of neutral salt fog testing with marginal success [A. Seth, W. J. van Ooij *, P. Puomi, Z. Yin, A. Ashirgade, S. Bafna, C. Shivane *Prog. In Org. Coatings* 2007, vol 58 pp 136-145]

Embodiments of the invention provide a corrosion-inhibiting primer coating that performs exceptionally well without the use of metals. Thus embodiments of this invention create a fully functioning primer that is metal-free and uses only environmentally safe organic additives. The metal-free primer coatings as described in the embodiments of the invention afford similar protection of metal surfaces when compared to the chromate-primers and exceed the performance of currently available chromate free alternatives. Thus, embodiments of this invention provide a powerful alternate solution to the use of the environmentally unsafe and toxic chromate primers by providing an effective and metal-free primer.

It is to be understood that the foregoing is exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

Embodiments of the invention provide instant access to chromate-free coating compositions that that when applied to metal surfaces provide excellent adhesion and protection from corrosive processes. The coating compositions of embodiments of the invention utilize molecular based organic-additives that can be labeled as additives to have discrete multivalent oxidation (DiMVO) states. In particular embodiments, the DiMVO used in the coating composition of the invention can include of phenothiazine and derivatives thereof. Another phenothiazine will have an N-alkyl group or some functionalized N-alkyl group. Other DiMVO additives can include organic core structures including triphenylamine and other aromatic single and multi-ring structures. In some cases the DiMVOs may include oxygen as a substituent connected to an aromatic ring. The metal-free coatings described in this invention may also include ancillary ingredients used in formulating paints that are known to those skilled in the art of paint formulations and coatings.

Embodiments of the invention are focused on preparing primer coatings that provide corrosion-inhibition and do so without the use metals in the coating formulation. Furthermore, the embodiments of the invention generally relate to creating new organic additives that when added to an epoxy coating formulation will create the new metal-free and corrosion-inhibiting primer coating compositions. Another embodiment of this invention is to add DiMVO additives to polyurethane primer formulations. Another aspect of the invention includes a coating composition having at least one discrete multivalent organic (DIMVOs) molecule, at least polyurethane, at least one hardener, and the components mixed to form a curable DiMVO coating composition.

Embodiments of this invention describe the synthesis of organic molecules that have Discrete MultiValent Oxidation states (DiMVO) and their use as additives in coating systems, thereby providing at least one mechanism for corrosion-inhibition and doing so without the use of metals, particularly chromate. The DiMVO can have at least one organic compound or be a single organic molecule that include a multi-ring aromatic chemical structure:

Another embodiment of this invention is the coating compositions that includes at least one DiMVO molecule, an epoxy resin, a hardener, an alkoxysilane-epoxy, and one or more of pigments, fillers and organic solvents. In dried coating, the percent of DiMVO is about 1-40% by weight, or in about 4-10% by weight. The DiMVO are formulated into epoxy coating compositions wherein two parts systems comprising of an epoxy resin and a hardener.

The curable DiMVO epoxy composition can be diluted with a variety of typical organic solvents including toluene, xylene, ethylbenzene, methyl ethyl ketone, methyl isobutyl ketone, methyl isobutyl carbinol, propyl acetate, butyl acetate, butyl butylrate, isopropanol, n-butanol, 4-chlorobenzenetrifluoride. They can be used in the range of about 1 wt-% to about 40 wt-%. The dilution by the organic solvent is used to achieve performance in spray applications.

The curable DiMVO epoxy composition, once applied to the metal surface, can be cured at ambient temperature for periods of 1 to 48 h. Another embodiment of this invention can apply heat to shorten the cure time. Cure temperatures of 30 to 100° C. or can be used with 30 to 50° C. Catalysts can be added to accelerate curing of the DiMVO epoxy composition. Typical catalysts can include imidazoles with 2-ethyl-4-methylimidazole and 2-methylimidazole. Other commercial catalysts including ECAT-243 can serve as latent curative additives for the DiMVO epoxy coating.

Figure 1:
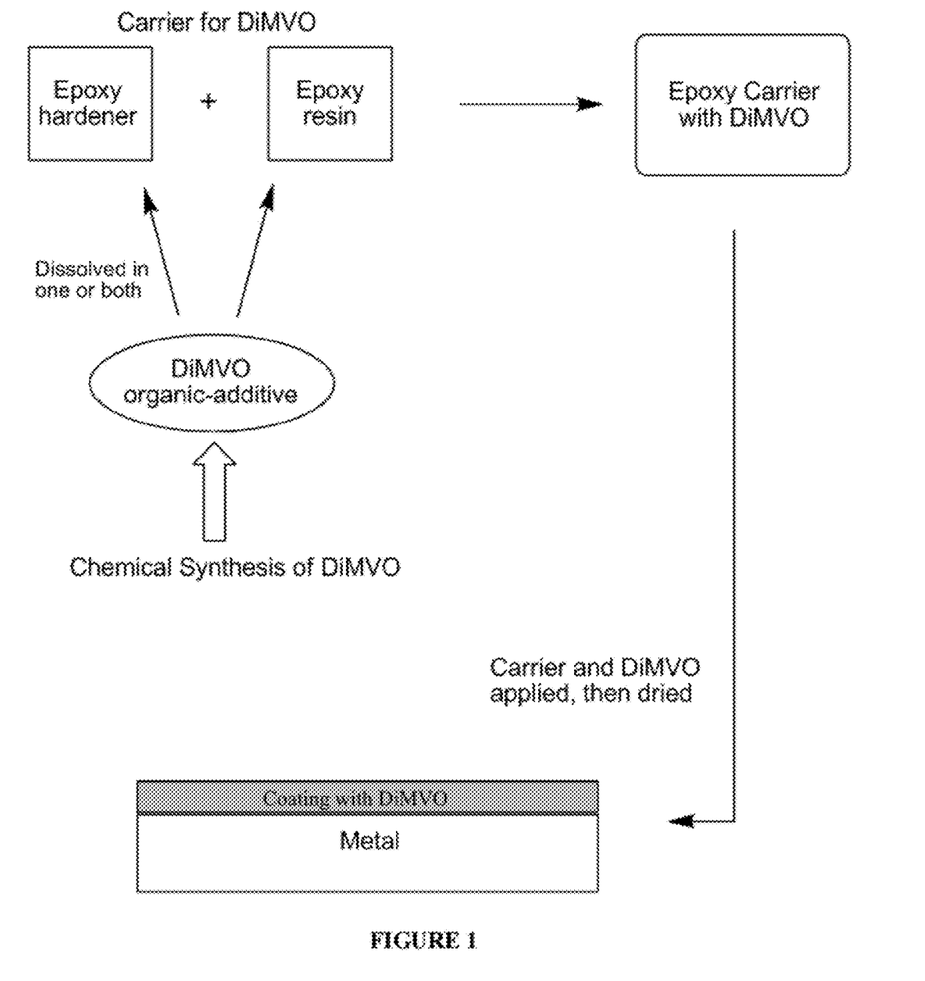
FIG. 1 is a general process diagram for preparing metal-free primers and application to a metal surface.
Figure 2A:
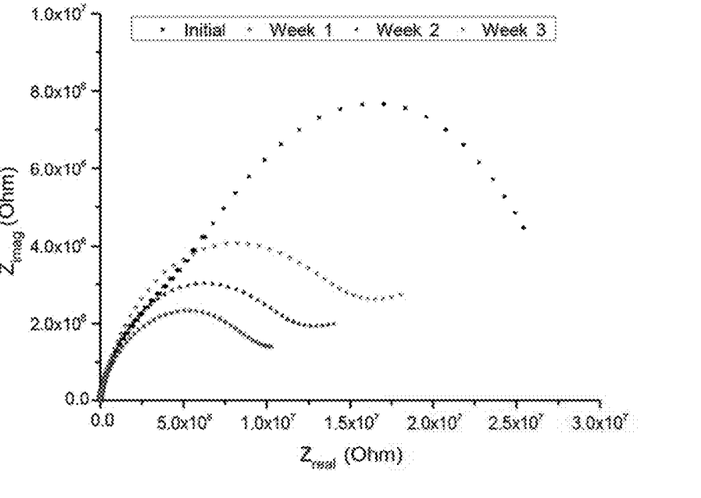
FIGS. 2A & B are graphs showing Electrochemical Impedance Spectroscopy (EIS) data plotted for aluminum panel coated with ~4% by weight of DiMVO-A modified epoxy primer, according to embodiments of the invention. Prekote pretreatment. Data taken during a 3 week period of soaking in a 3% sodium chloride solution.
Figure 2B:
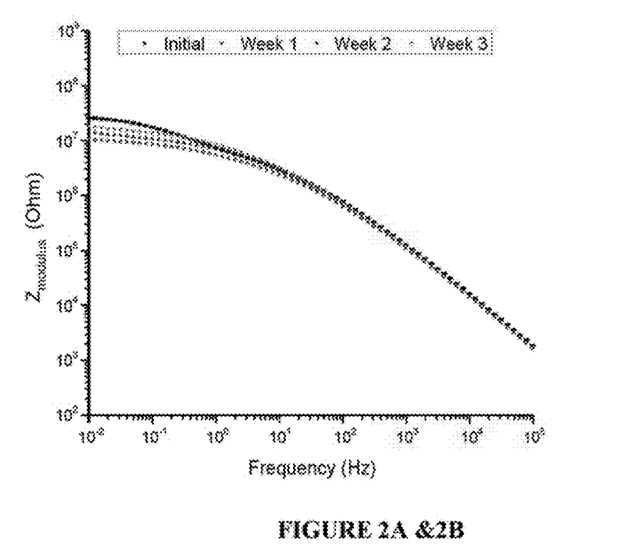
Figure 3A:
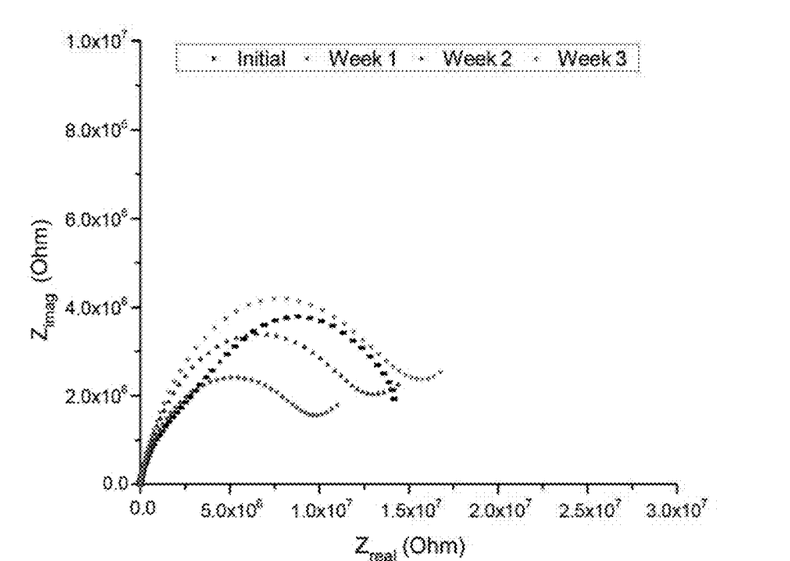
FIGS. 3A & B are graphs showing EIS data plotted for aluminum panel coated with ~4% by weight of DiMVO-A modified epoxy primer, according to embodiments of the invention. Scotch brite pretreatment. Data taken during a 3 week period of soaking in a 3% sodium chloride solution.
Figure 3B:
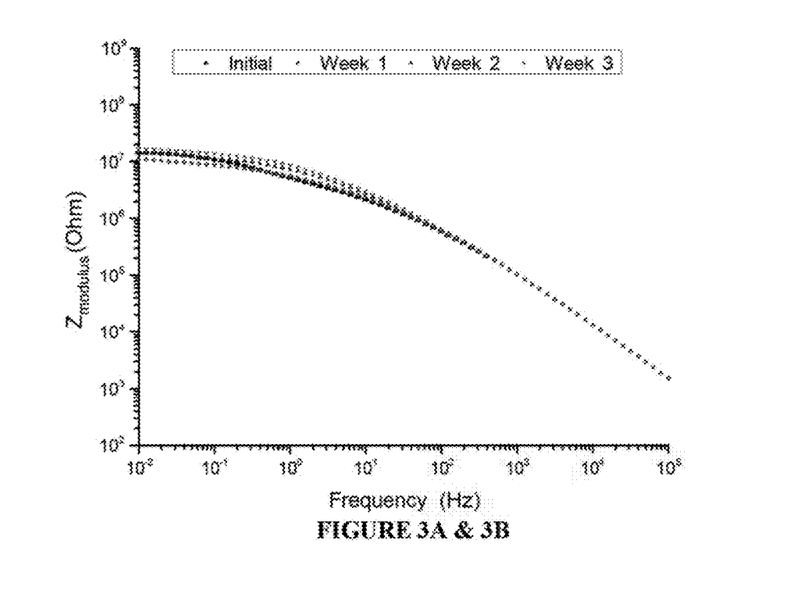
Figure 4:
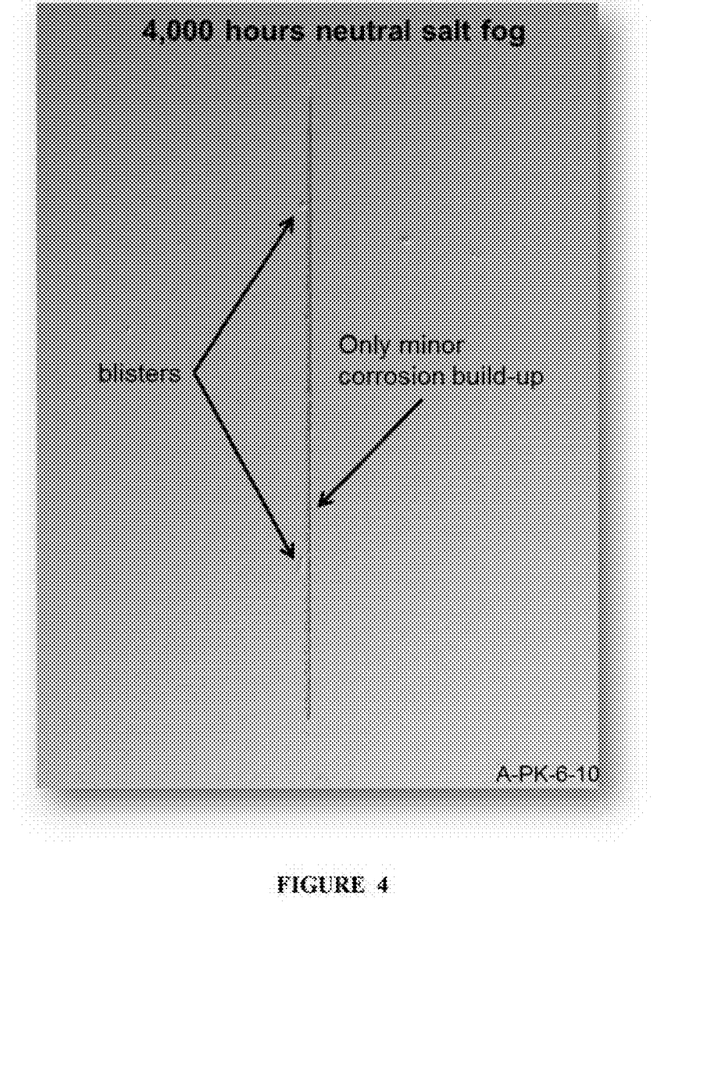
FIG. 4 is a top perspective view of a 2024 T3 panel with DiMVO having a primer coat and pre-treated with Prekote after 4,000 hours exposure under neutral salt fog condition, according to embodiments of the invention (Neutral salt fog testing (4,000 hours)).
Figure 5:
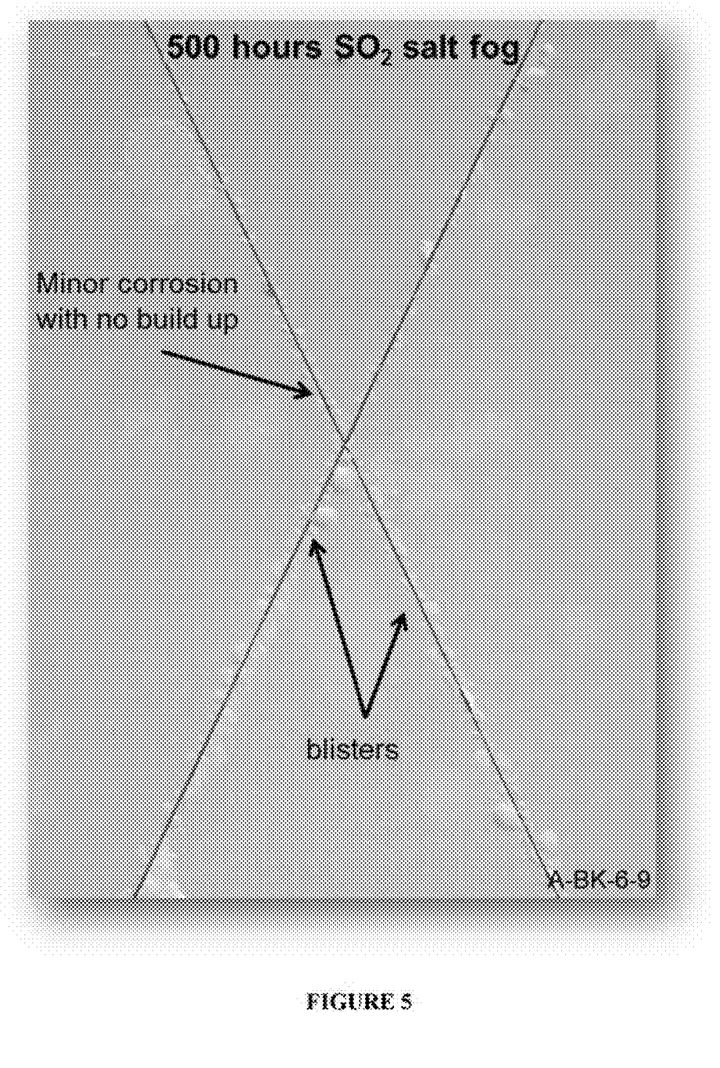
FIG. 5 is a top perspective view of a 2024 T3 panel with DiMVO A primer coat and pre-treated with Scotch Brite after 500 hours exposure under $SO_2$ salt fog condition, according to embodiments of the invention. ($SO_2$ salt fog testing (500 hours))

Another embodiment of this invention is that DiMVO can be formulated into either the epoxy resin or the epoxy hardener. (FIG. 1).

In another embodiment, DiMVO includes at least one phenothiazine derivative. The phenothiazine(s) can be selected with substitution at the ring nitrogen with a either neutral, anionic, or cationic group that exist as organic salts:

neutral          organic salt

The anionic phenothiazinescan have a substitution at the ring nitrogen with a sulfonate, carboxylate, phosphosphate group, or the combination thereof with lithium, sodium, potassium, or ammonium as the counter cation, have R1 group of C1 to about C12, and/or substitution on the aromatic ring R2 is selected from H, and/or C1 to C12 alkyl group (formula A).

Formula A $X = SO_3, CO_2, PO_3$

The cationic phenothiazines can have a substitution at the ring nitrogen with an ammonium, phosphonium group, or the combination thereof with fluoride, chloride, bromide, iodide, sulfonate, trifluoromethanesulfonate, or trifluoromethanesulfonamide as the counter anion, have R1 group of C1 to C12 between the cationic group and phenothiazine, and/or substitution on the aromatic ring R2 selected from H, or C1 to C12 alkyl group (formula B).

Formula B

Y = NH₃, NH₂R, NHR₂, NR₃, PR₃

The neutral phenothiazine can have substitution at the ring nitrogen with an alkyl or aryl group, R, of C1 to C12 carbon, and/or substitution on the aromatic ring R2 selected from H, or C1 to C12 alkyl group (formula C).

Formula C

In addition to phenothiazine structures, other substituted heteroaromatic compounds can be selected from but not limited to thiophene, benzothiophene, pyrrole, indole, furan, benzofuran, pyridine, and imidazole. Another embodiment of this invention includes DiMVOs that have a chemical oxidation potential within about 0.5 V of 1-methylphenothiazine.

When used in the coating composition, the neutral phenothiazine should be dissolved in the carrier so that it will occupy 1-30% by weight of the final dried coating, or 2-10% by weight. Likewise, the organic salt of phenothiazine should be dissolved in the carrier so that it will occupy 1-30% by weight of the final dried coating, or 2-10% by weight, or 4-6 wt-%. In some cases Y+ will be sodium and potassium, or Y+ is lithium.

Embodiments of the invention generally relate to coating compositions including, at least one discrete multivalent organic (DIMVOs) molecule, at least one epoxy resin, at least one hardener, and the components mixed to form a curable DiMVO epoxy coating composition. In embodiments, at least one epoxy resin includes at least one pigment, at least one filler, and at least one solvent. Embodiments further include at least one alkoxysilane epoxy. In embodiments, the composition includes a first sub-composition and a second sub-composition, where the first sub-composition includes at least one epoxy resin, at least one alkoxysilane-epoxy, and at least one pigment, filler, and organic solvent, and where the second sub-composition includes at least one hardener and at least one organic solvent, and the sub-components mixed to form a curable composition. Embodiments further include a curing catalyst.

In embodiments, the DiMVO molecules are selected from the group of phenothiazine derivatives having at least one pendant group selected from the group consisting of anionic, cationic, neutral group, and any combination thereof. In embodiments, the anionic phenothiazines (Formula A) having a substitution at the ring nitrogen with a sulfonate, carboxylate, phosphosphate group, or the combination thereof with lithium, sodium, potassium, or ammonium as the counter cation, where R1 group is C1 to C12 between an acid group and the phenothiazine, and/or substitution on the aromatic ring, where R2 is selected from the group consisting of H and C1 to C12 alkyl group, and where X is selected from the group consisting of SO₃, CO₂, and PO₃. In embodiments, the cationic phenothiazines (Formula B) a substitution at the ring nitrogen with an ammonium, phosphonium group, or the combination thereof with fluoride, chloride, bromide, iodide, sulfonate, trifluoromethanesulfonate, or trifluoromethanesulfonamide as the counter anion, where R1 group is C1 to C12 between a cationic group and the phenothiazine, and/or substitution on the aromatic ring, where R2 is selected from the group consisting of H and C1 to C12 alkyl group, and where Y is selected from the group consisting of NH₃, NH₂R, NR₃, PR₃.

In embodiments, the neutral phenothiazines (Formula C) have substitution at the ring nitrogen with an alkyl group, where R1 is C1 to C12 carbon and/or substitution on the aromatic ring, where R2 is selected from group consisting of H and C1 to C12 alkyl group. In embodiments, the composition is diluted with 1 wt-% to about 100 wt-% of at least one organic solvent to create a second curable DiMVO epoxy composition. In embodiments, the second composition is applied to a metal surface by spraying to form a coating of 0.1 mm to 3.0 mm thick. In embodiments, the second composition is dried at about 25° C. to about 100° C. In embodiments, the composition when fully-cured includes 1 weight % to about 20 weight % of DiMVO molecule. In other embodiments, the composition when fully-cued includes about 3 weight % to 10 weight % of DiMVO molecule.

In embodiments, the epoxy resin(s) is aromatic and is selected from the group consisting of Bisphenol A and Bisphenol F resins having at least two epoxy groups per molecule with an epoxy equivalent weight in the range of about 100 to about 2,000. In embodiments, the hardener(s) is selected from the groups consisting of polyamines and polyamides having amine hydrogen equivalent weight values ranging from about 50 to 300 mg KOH/gram.

Another aspect of the invention generally relates to coating compositions including, at least one discrete multivalent organic (DIMVOs) molecule, at least one epoxy resin, at least one hardener, at least one alkoxysilane-epoxy, and the components mixed to form a curable DiMVO epoxy coating composition. In embodiments, the alkoxysilane-epoxy having the formula D, where R is selected from the group consisting of alkyl groups of any combination of C1 to C3, and n is in the range of about 1 to about 5. In embodiments, the composition includes a weight ratio of the epoxy resin to the polyamine hardener in the range of about 2:1 to about 5:1, and a weight ratio of the epoxy resin to the alkoxysilane-epoxy of about 10:1 to about 20:1. Embodiments further include pigments and fillers selected from the group consisting of organic and inorganic color pigments, and any combination thereof.

In embodiments, the composition includes up to about 50 percent by weight of the total the pigments and the fillers based on the total weight of the composition. Embodiments further include at least one organic solvent(s) is selected from the group consisting of toluene, xylene, ethylbenzene, methyl ethyl ketone, methyl isobutyl ketone, methyl isobutyl carbinol, propyl acetate, butyl acetate, isopropanol, n-butanol, 4-chlorobenzenetrifluoride, and in the range of about 30 percent by weight to about 60 percent by weight of the composition. In embodiments, the organic solvent is selected from the group consisting of toluene, xylene, ethylbenzene, methyl ethyl ketone, methyl isobutyl ketone, methyl isobutyl carbinol, propyl acetate, butyl acetate, butyl butylrate, isopropanol, n-butanol, 4-chlorobenzenetrifluoride, and in the range of about 10 percent by weight to about 40 percent by weight. In embodiments, the DiMVO pigments are dissolved into either the epoxy resin of the first sub-composition or the polyamine curing agent solution of the second sub-composition.

Another aspect of the invention generally relates to methods of making a fully-cured epoxy coating on metal substrates including, mixing at least one epoxy resin, at least one alkoxysilane-epoxy, at least one pigment and at least one filler, and at least one organic solvent to form a first sub-composition, mixing a DiMVO molecule(s), at least one hardener, and at least one organic solvent to form a second sub-composition, combining the first sub-composition and the second sub-composition to form a curable composition, applying the curable composition in the form of a coating on a metal substrate, and drying and curing the curable composition on the metal substrate.

In embodiments, the metal substrate is selected from the group consisting of aluminum, aluminum alloy, steel, and steel alloy. In embodiments, the cured composition coating is anti-corrosion after 500 hours of SO2 salt fog testing and 4,000 hours of neutral salt fog testing. In other embodiments, the cured composition coating is adhered to the metal substrate yielding ASTM D3359 ratings of about 4B or 5B value.

The carrier used in embodiments of the invention is any compound or mixture of compounds capable delivering the coating system to the substrate (i.e. metal surface) and then curing to form a solid film. Other embodiments can be used with combinations of compounds that include water as one of the major constituents. Other carriers can be aqueous solutions, epoxy coating formulations, sealants (e.g. manganese oxide cured polysulfide), and other carriers as known to those skilled in the art. Another embodiment of the invention is to mix the DiMVO with a polyurethane coating system and apply this to a metal surface by spray or brush. Another aspect of the invention relates to a coating composition including, at least one discrete multivalent organic (DIMVOs) molecule, at least one epoxy resin, at least one hardener, at least one alkoxysilane-epoxy, and the components mixed to form a curable DiMVO epoxy coating composition.

DiMVO A was dissolved in a commercial epoxy hardener (EP-430, Polyfiber Inc) at a concentration of about 10% by weight. The DiMVO hardener was mixed with two parts of an epoxy resin (EP 420W, Polyfiber, Inc) and further diluted with organic solvents. Within 30 min this curable DiMVO epoxy composition was applied via spray application onto aluminum 2024-T3 panels. The aluminum 2024-T3 panels before application of the coating were cleaned and prepared using one of three chromate-free techniques. In a similar manner, hardener solutions comprising DiMVO B and DiMVO C were prepared as above. Once applied to the aluminum surface the coatings were cured and dried to afford final coatings that include about 4 wt-% DiMVO.

The metal panels have been pre-treated with Scotch Brite, Prekote, and TCP. Scotch Brite is an abrasive material that mechanically cleans metal surfaces. Prekote is a commercial aqueous solution that cleans a metal surface by chemical means using no metals. Trivalent chromium(III) process (TCP) is a surface pretreatment process developed by US Navy. After drying these panels were measured for coating thickness and tested for adhesion (Table 1) to the metal surface. A film thickness about 2 mils was obtained. These primer films demonstrated a range of good to excellent adhesion to the 2024-T3 panels with Scotch Brite and Prekote pretreatments.

TABLE 1

DiMVO epoxy coating thickness measurement (ASTM 376) and adhesion test (ASTM 3359)

| Sample # [d] | Coating thickness, mils [a] Average | Adhesion [b] Rating #1 [c] | Rating #2 [c] |
|---|---|---|---|
| DiMVO A-PK | 2.12 | 5B | 5B |
| DiMVO B-PK | 2.20 | 3B | 4B |
| DiMVO A-SB | 2.01 | 5B | 5B |
| DiMVO B-SB | 2.03 | 3B | 3B |
| DiMVO C-PK | 1.58 | 5B | 5B |
| DiMVO C-SB | 2.02 | 5B | 5B |

[a] Measured according to ASTM D376 method
[b] Measured according to ASTM D3359 method
[c] Adhesion rating measured and rated in two locations; 5B = 0% area removed by tape; 3B = 5-15% area removed; 0B = greater than 65% area removed.
[d] A-PK designated as sample #1 with DiMVO A coating with PreKote (PK) pretreatment. SB denoted as Scott Brite pretreatment.

These primer coating panels were tested for surface corrosion under the conditions of $SO_2$ salt fog and a neutral salt fog. The coating was initially scribed according to ASTM procedure to expose the bare metal surface. $SO_2$ salt fog is acidic in nature and thus considered a more "aggressive" test for metal corrosion. The 500 hours test results are summarized in Table 2. In both cases of DiMVO A and DiMVO B primers, only staining with no corrosion build up was observed along with few blisters found. Both Scotch Brite and Prekote pretreated panels performed similarly. This result demonstrated excellent anti-corrosion properties derived from DiMVO molecules in the primer coating. In addition, a commercial aerospace top coat was deposited on top of a DiMVO primer, and it also showed minor corrosion on the scribed area. These results are considered excellent for metal-free primers in the coating compositions.

TABLE 2

$SO_2$ salt fog (ASTM XX) testing result after 500 hours exposure

| Sample # | Scribe appearance | Rust Creepage Reading | Isolated | Size | Blistering Freq | Isolated |
|---|---|---|---|---|---|---|
| Prime only | | | | | | |
| DiMVO A-PK | staining | lifting 1/16" | 5 | very small | medium | |
| DiMVO A-SB | staining | lifting 1/16" | | very small | | 1 |
| DiMVO B-SB | staining | lifting 1/8" | 5 | small | few | |
| DiMVO B-PK | staining | lifting 1/16" | | very small | | |
| Top Coat | | | | | | |
| DiMVO C-PK | minor corrosion | lifting >1/2" | | med to large | | |
| DiMVO C-SB | minor corrosion | lifting >1/2" | | small | | |

[a] [a] 0 = clean; 1 = staining; 2 = minor corrosion product build up; 3 = moderate corrosion product build up; 4 = major corrosion product build up; 5 = sever corrosion product build up
[b] 0 = no lifting of coating; 1 = lifting/loss of adhesion up to 1/16"; 2 = lifting/loss of adhesion up to 1/8"; 3 = lifting/loss of adhesion up to 1/4"; 4 = lifting/loss of adhesion up to 1/2"; 5 = lifting/loss of adhesion >1/2"
[c] # of isolated blisters The 2024-T3 panels were further testing under neutral salt fog and the 4,000 hours results are summarized in Table 3. DiMVO A, DiMVO B and DiMVO C primers showed excellent results on anti-corrosion on the scribed areas and few blisters among the Scotch Brite and Prekote pre-treated panels. TCP pre-treated panels, however, did not show the same level of anti-corrosion performance with DiMVO additives in the same primers. In addition, a commercial aerospace top coat was deposited on top of the DiMVO primers. These panels showed staining without corrosion build up on the scribed area along with few blisters after 4,000 hours of testing. These results are considered excellent for metal-free primers in the coating compositions.

TABLE 3

Neutral salt fog (ASTM B117) testing result after 4,000 hours exposure

| Sample # | Scribe Appearance [a] | Rust Creepage Reading [b] | Blistering Isolated Size | Freq | Isolated [c] |
|---|---|---|---|---|---|
| Primer Only | | | | | |
| DiMVO A-PK | staining | no lifting | very small | Few | |
| DiMVO ASB | staining | lifting 1/16" | none | | 1 |
| DiMVO A-TCP | major corrosion | no lifting | med to large | Few | |
| DiMVO B-PK | minor corrosion | no lifting | med to large | Few | 1 |
| DiMVO B-SB | staining | lifting 1/8" | very small | Few | |
| DiMVO B-TCP | severe corrosion | lifting 1/16" | none | | 5 |
| DiMVO C-PK | none | no lifting | very small | Medium | 2 |
| DiMVO C-SB | staining | no lifting | very small | Few | |
| Top Coat | | | | | |
| DiMVO A-PK | staining | no lifting | none | | |
| DiMVO A-SB | staining | no lifting | none | | |
| DiMVO B-PK | staining | no lifting | none | | |
| DiMVO B-SB | staining | no lifting | none | | |
| DiMVO C-PK | staining | no lifting 3 | none | | 3 |
| DiMVO C-SB | staining | no lifting | small | Few | 3 |

[a] [a] 0 = clean; 1 = staining; 2 = minor corrosion product build up; 3 = moderate corrosion product build up; 4 = major corrosion product build up; 5 = severe corrosion product build up
[b] 0 = no lifting of coating; 1= lifting/loss of adhesion up to 1/16"; 2 = lifting/loss of adhesion up to 1/8"; 3 = lifting loss of adhesion up to 1/4"; 4 = lifting/loss of adhesion up to 1/2"; 5 = lifting/loss of adhesion >1/2"
[c] # of isolated blisters

EXAMPLES

Synthesis of DiMVO molecules, A, B and C are described below.

Lithium 3-(10H-phenothiazin-10-yl)propane-1-sulfonate (DiMVO A):

To a solution of 25 grams phenothiazine (0.125 mol) in 300 mL dry THF at −70° C. was added 50 mL 2.5M n-BuLi. The mixture was allowed to warm to −15° C. then cooled back to −70° C. A solution of 15.27 grams 1,3-propane sultone (0.125 mol) in 50 mL THF was then added. The mixture was allowed to warm to room temperature then stirred overnight. The solvent was then removed in vacuum to give 50.42 grams of a yellowish glass. This was recrystallized from 400 mL ethanol to give 10.54 grams of a white solid (26%). $^1$H NMR (DMSO-d$_6$): 7.1 (m, 4H), 7.0 (d, 2H), 6.8 (t, 2H), 3.94 (t, 2H), 2.47 (t, 2H), 1.95 (m, 2H) of lithium 3-(10H-phenothiazin-10-yl)propane-1-sulfonate.

N-(3-Chloropropyl)phenothiazine:

20 mL 2.5M n-butyl lithium (50 mmol) was added to a solution of 10.0 grams phenothiazine (50 mmol) in 150 mL THF at −70° C. The thick yellow mixture was allowed to warm to 0 then cooled back to −70° C. 6.0 mL 3-bromopropyl chloride (61 mmol, 1.22 mol-equiv) was added. The mixture was allowed to warm to room temperature and stirred for 72 h then refluxed an additional 24 h. The clear yellow solution was cooled and concentrated in vacuum. The residue was taken up in 100 mL methylene chloride and washed with water then dried (MgSO$_4$) and concentrated in vacuum to give 12.10 grams of an oily solid (88%). The sample was purified by column chromatography on silica gel using 5% EtOAc in hexanes to afford a white solid (6.57 g, 36%) after removal of the solvents. This proved to be a mixture of 56% chloro, 22% bromo and 22% allyl by NMR.

N-(3-Iodopropyl)phenothiazine:

A mixture of 25.39 grams N-(3-chloropropyl)phenothiazine and N-(3-bromopropyl)phenothiazine (containing <0.1 moles) and 18 grams sodium iodide (0.12 mol) in 150 mL acetone was refluxed overnight then cooled and concentrated in vacuum. The residue was taken up in 150 mL methylene chloride and washed with water then dried (MgSO$_4$) and concentrated in vacuum to give 23.31 grams tan solid (63%). This was recrystallized from 100 mL ethanol to give 7.74 grams of a white solid (21%).

N-(3-Trimethylammoniumpropyl)phenothiazine Iodide:

A solution of 7.50 grams N-(3-iodopropyl)phenothiazine (20 mmol) in 20 mL of a 4.2 M solution of trimethylamine in ethanol (84 mmol, 4.1 mol-equiv) was stirred for 48 hours at ambient temperature then diluted with 200 mL ether. The solids were filtered off and washed with ether to give 6.53 grams of a white solid (77%).

N-(3-Trimethylammonium)phenothiazine bis(trifyl)imide (DiMVO B):

CH$_2$CH$_2$CH$_2$NMe$_3$$^+$N(SO$_2$CF$_3$)$_2$$^-$ 18.8 grams N-(3-trimethylammoniumpropyl)phenothiazine iodide (44 mmol) was dissolved in 2 L of water at 80° C. (with filtering if necessary). To this was added a solution of 14 grams lithium bis(trifyl)imide (49 mmol, 1.1 mol-equiv) in 25 mL water. The mixture was allowed to cool and the liquids were decanted off of the pinkish solid material which was washed with water and dried to afford a pinkish in color and slightly waxy solid (21.58 g, 85%).

N-Methylphenothiazine (DiMVO C):

500 grams phenothiazine (2.5 moles) was dissolved in 1.5 L DMSO in a 5 L 3-necked round bottom flask with a mechanical stirrer. 70 grams NaH (2.77 moles, 1.1 eq) was added in portions. The mixture was stirred for 30 minutes then 284 mL dimethylsulfate (3 moles, 1.2 eq) was added dropwise with cooling (ice water bath) keeping the temperature below 70° C. The mixture was allowed to cool and stir overnight then poured into 4 L ice water. The solids were filtered off and washed with water. The solids were suspended in 2 L of hot water then filtered off, washed with water and dried. The crude material was recrystallized from 4.4 L ethanol to give 479.2 grams of a white solid. (90%). Mp 94-95° C. $^1$H NMR (CDCl$_3$): 7.2 (d, 4H), 6.95 (t, 2H), 6.85 (d, 2H), 3.4 (very broad singlet, 3H). $^{13}$C NMR (CDCl$_3$): 145.84, 127.46, 127.17, 123.43, 122.48, 114.12, 35.31.

A series of epoxy coating compositions were formulated including 1-20% by weight of DiMVO molecules in the hardener (Part B). They were mixed with the epoxy resin (Part A) in the stoichiometry ratios based on the resin's epoxy equivalent weight (EEW) and hardener's amine values. The final concentrations DiMVO molecules in the fully-cured coating are about 4-10% by weight. Additionally the mixture is further thinned with organic solvent, and applied to a metal surface one of the following methods—spraying, rolling or brushing. For aluminum substrate three surface preparations were carried out in the examples presented. They were: (1) mechanical abrasion using Scotch Brite (green, denoted as SB in sample labeling), (2) Prekote wash (denoted as PK), and (3) trivalent chrome pretreatment (TCP).

Adhesion testing and coating thickness on fully-cured DiMVO coatings on 2024-T3 panels are shown in Table 1. The DiMVO including primers were prepared by adding the DiMVO to the hardener, mixing with the resin part, and then diluted with an organic solvent to a viscosity ideal for spray coating. The DiMVO primers were spray coated onto aluminum 2024-T3 panels that have been pretreated with one of three processes. The coatings were about 2 mm in thickness and dried at about 50° C. for 24 hour prior to adhesion testing and immersion in the neutral salt fog testing.

TABLE 1

DiMVO epoxy coating thickness measurement (ASTM D376) and adhesion test (ASTM D3359)

| Sample # [d] | Coating thickness, mils [a] Average | Adhesion [b] Rating #1 [c] | Rating #2 [c] |
|---|---|---|---|
| DiMVO A-PK | 2.12 | 5B | 5B |
| DiMVO B-PK | 2.20 | 3B | 4B |
| DiMVO A-SB | 2.01 | 5B | 5B |
| DiMVO B-SB | 2.03 | 3B | 3B |
| DiMVO C-PK | 1.58 | 5B | 5B |
| DiMVO C-SB | 2.02 | 5B | 5B |

[a] Measured according to ASTM D376 method
[b] Measured according to ASTM D3359 method
[c] Adhesion rating measured and rated in two locations; 5B = 0% area removed by tape; 3B = 5-15% area removed; 0B = greater than 65% area removed.
[d] A-PK designated as sample #1 with DiMVO A coating with PreKote (PK) pretreatment. SB denoted as Scott Brite pretreatment.

TABLE 2

SO$_2$ salt fog (ASTM G85) testing result after 500 hours exposure

| Sample # | Scribe appearance | Rust Creep Reading | Isolated | Blistering Size | Freq | Isolated |
|---|---|---|---|---|---|---|
| Primer only | | | | | | |
| DiMVO A-PK | staining | lifting 1/16" | 5 | very small | medium | |
| DiMVO A-SB | staining | lifting 1/16" | | very small | | 1 |
| DiMVO B-SB | staining | lifting 1/8" | 5 | small | few | |
| DiMVO B-PK | staining | lifting 1/16" | | very small | | |
| Top Coat | | | | | | |
| DiMVO C-PK | minor corr | lifting >1/2" | | med to large | | |
| DiMVO C-SB | minor con | lifting >1/2" | | small | | |

[a] 0 = clean; 1 = staining; 2 = minor corrosion product build up; 3 = moderate corrosion product build up; 4 = major corrosion product build up; 5 = severe corrosion product build up
[b] 0 = no lifting of coating; 1 = lifting/loss of adhesion up to 1/16"; 2 = lifting/loss of adhesion up to 1/8"; 3 = lifting/loss of adhesion up to 1/4"; 4 = lifting/loss of adhesion up to 1/2"; 5 = lifting/loss of adhesion >1/2"
[c] # of isolated blisters

TABLE 3

Neutral salt fog (ASTM B117) testing result after 4,000 hours exposure

| Sample # | Scribe Appearance [a] | Rust Creep ASTM D1654 Reading [b] | Isolated | Blistering ASTM D714 Size | Freq | Isolated [c] |
|---|---|---|---|---|---|---|
| Primer Only | | | | | | |
| DiMVO A-PK | staining | no lifting | | none | | 2 |
| DiMVO A-SB | staining | lifting 1/16" | | none | | 1 |
| DiMVO A-TCP | major corr | no lifting | | med to large | Few | |
| DiMVO B-PK | major corr | no lifting | | med to large | Few | 1 |

TABLE 3-continued

Neutral salt fog (ASTM B117) testing result after 4,000 hours exposure

| Sample # | Scribe Appearance [a] | Rust Creep ASTM D1654 Reading [b] | | Blistering ASTM D714 | | |
|---|---|---|---|---|---|---|
| | | | Isolated | Size | Freq | Isolated [c] |
| DiMVO B-SB | staining | lifting 1/8" | | very small | Few | |
| D iMVO B-TCP | severe corr | lifting 1/16" | | none | | 5 |
| DiMVO C-PK | none | no lifting | | very small | Medium | 2 |
| DiMVO C-SB | staining | no lifting | | very small | Few | |
| Top Coat | | | | | | |
| DiMVO A-PK | staining | no lifting | | none | | |
| DiMVO A-SB | staining | no lifting | | none | | |
| DiMVO B-PK | staining | no lifting | | none | | |
| DiMVO B-SB | staining | no lifting | | none | | |
| DiMVO C-PK | staining | no lifting | 3 | none | | 3 |
| DiMVO C-SB | staining | no lifting | | small | Few | 3 |

[a] 0 = clean; 1 = staining; 2 = minor corrosion product build up; 3 = moderate corrosion product build up; 4 = major corrosion product build up; 5 = severe corrosion product build up
[b] 0 = no lifting of coating; 1 = lifting/loss of adhesion up to 1/16"; 2 = lifting/loss of adhesion up to 1/8"; 3 = lifting/loss of adhesion up to 1/4"; 4 = lifting/loss of adhesion up to 1/2"; 5 = lifting/loss of adhesion >1/2"
[c] # of isolated blisters Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A coating composition, comprising:
   at least one discrete multivalent organic (DiMVOs) molecule;
   at least one epoxy resin;
   at least one hardener; and
   said components mixed to form a DiMVO epoxy coating composition, wherein said composition is diluted with 1 wt-% to about 100 wt-% of at least one organic solvent to create a second curable DiMVO epoxy composition.

2. The composition according to claim 1, wherein said at least one epoxy resin includes at least one pigment, at least one filler, and at least one solvent.

3. The composition according to claim 1, further comprising at least one alkoxysilane epoxy.

4. The composition according to claim 3, wherein said composition comprises,
   a first sub-composition and a second sub-composition;
   wherein said first sub-composition comprises at least one said epoxy resin, at least one said alkoxysilane-epoxy, and at least one said pigment, said filler, and said organic solvent; and
   wherein said second sub-composition comprises at least one said hardener and at least one said organic solvent; and
   said sub-components mixed to form a curable composition.

5. The composition according to claim 4, further comprising a curing catalyst.

6. The composition according to claim 1, wherein said DiMVO molecules are selected from the group of phenothiazine derivatives having at least one pendant group selected from the group consisting of anionic, cationic, neutral group, and any combination thereof.

7. The composition according to claim 6, wherein said anionic phenothiazines (Formula A) having a substitution at the ring nitrogen with a sulfonate, carboxylate, phosphosphate group, or the combination thereof with lithium, sodium, potassium, or ammonium as the counter cation;
   wherein R1 group is C1 to C12 between an acid group and said phenothiazine, and/or substitution on said aromatic ring;
   wherein R2 is selected from the group consisting of H and C1 to C12 alkyl group; and
   wherein X is selected from the group consisting of $SO_3$, $CO_2$, and $PO_3$.

Formula A

X = $SO_3$, $CO_2$, $PO_3$

8. The composition according to claim 6, wherein said cationic phenothiazines (Formula B) a substitution at the ring nitrogen with an ammonium, phosphonium group, or the combination thereof with fluoride, chloride, bromide, iodide, sulfonate, trifluoromethanesulfonate, or trifluoromethanesulfonamide as the counter anion;
   wherein R1 group is C1 to C12 between a cationic group and said phenothiazine, and/or substitution on said aromatic ring;
   wherein R2 is selected from the group consisting of H and C1 to C12 alkyl group; and
   wherein Y is selected from the group consisting of $NH_3$, $NH_2R$, $NR_3$, $PR_3$.

Formula B

Y = $NH_3$, $NH_2R$, $NHR_2$, $NR_3$, $PR_3$

9. The composition according to claim 6, wherein said neutral phenothiazines (Formula C) have substitution at the ring nitrogen with an alkyl group;
    wherein R1 is C1 to C12 carbon and/or substitution on said aromatic ring;
    wherein R2 is selected from group consisting of H and C1 to C12 alkyl group.

Formula C

10. The composition according to claim 1, wherein said second composition is applied to a metal surface by spraying to form a coating of 0.1 mm to 3.0 mm thick.

11. The composition according to claim 1, wherein said second composition is dried at about 25° C. to about 100° C.

12. The composition according to claim 1, wherein said composition when fully-cured comprises 1 weight % to about 20 weight % of DiMVO molecule.

13. The composition according to claim 1, wherein said composition when fully-cured comprises about 3 weight % to 10 weight % of DiMVO molecule.

14. The composition according to claim 1, wherein said epoxy resin(s) is aromatic and is selected from the group consisting of Bisphenol A and Bisphenol F resins having at least two epoxy groups per molecule with an epoxy equivalent weight in the range of about 100 to about 2,000.

15. The composition according to claim 1, wherein said hardener(s) is selected from the groups consisting of polyamines and polyamides having amine hydrogen equivalent weight values ranging from about 50 to 300 mg KOH/gram.

16. A coating composition, comprising:
    at least one discrete multivalent organic (DiMVOs) molecule;
    at least one epoxy resin;
    at least one hardener;
    at least one alkoxysilane-epoxy, and
    said components mixed to form a DiMVO epoxy coating composition, wherein said composition is diluted with 1 wt-% to about 100 wt-% of at least one organic solvent to create a curable DiMVO epoxy composition.

17. The composition according to claim 16, wherein said alkoxysilane-epoxy having the formula D;
    wherein R is selected from the group consisting of alkyl groups of any combination of C1 to C3, and n is in the range of about 1 to about 5.

Formula D

18. The composition according to claim 16, wherein said composition comprises a weight ratio of said epoxy resin to said polyamine hardener in the range of about 2:1 to about 5:1, and a weight ratio of said epoxy resin to said alkoxysilane-epoxy of about 10:1 to about 20:1.

19. The composition according to claim 16, further comprising pigments and fillers selected from the group consisting of organic and inorganic color pigments, and any combination thereof.

20. The composition according to claim 19, wherein said composition comprises up to about 50 percent by weight of the total said pigments and said fillers based on the total weight of said composition.

21. The composition according to claim 16, further comprising at least one organic solvent(s) is selected from the group consisting of toluene, xylene, ethylbenzene, methyl ethyl ketone, methyl isobutyl ketone, methyl isobutyl carbinol, propyl acetate, butyl acetate, isopropanol, n-butanol, 4-chlorobenzenetrifluoride, and in the range of about 30 percent by weight to about 60 percent by weight of said composition.

22. The composition according to claim 21, wherein said organic solvent is selected from the group consisting of toluene, xylene, ethylbenzene, methyl ethyl ketone, methyl isobutyl ketone, methyl isobutyl carbinol, propyl acetate, butyl acetate, butyl butylrate, isopropanol, n-butanol, 4-chlorobenzenetrifluoride, and in the range of about 10 percent by weight to about 40 percent by weight.

23. The composition according to claim 19, wherein said DiMVO pigments are dissolved into either said epoxy resin of said first sub-composition or said polyamine curing agent solution of said second sub-composition.

24. A method of making a fully-cured epoxy coating on metal substrates, comprising:
    mixing at least one epoxy resin, at least one alkoxysilane-epoxy, at least one pigment and at least one filler, and at least one organic solvent to form a first sub-composition;
    mixing a DiMVO molecule(s), at least one hardener, and at least one organic solvent to form a second sub-composition;
    combining said first sub-composition and said second sub-composition to form a curable composition;
    applying said curable composition in the form of a coating on a metal substrate; and
    drying and curing said curable composition on said metal substrate.

25. The method according to claim 24, wherein said metal substrate is selected from the group consisting of aluminum, aluminum alloy, steel, and steel alloy.

26. The method according to claim 24, wherein said cured composition coating is anti-corrosion after 500 hours of $SO_2$ salt fog testing and 4,000 hours of neutral salt fog testing.

27. The method according to claim 24, wherein said cured composition coating is adhered to said metal substrate yielding ASTM D3359 ratings of about 4B or 5B value.

28. A coating composition, comprising:
    at least one discrete multivalent organic (DiMVOs) molecule;
    at least polyurethane;
    at least one hardener, and
    said components mixed to form a DiMVO epoxy coating composition, wherein said composition is diluted with 1 wt-% to about 100 wt-% of at least one organic solvent to create a curable DiMVO epoxy composition.

* * * * *